United States Patent
Kobayashi et al.

(10) Patent No.: US 7,461,875 B2
(45) Date of Patent: Dec. 9, 2008

(54) INJECTION-MOLDED PRODUCT AND ITS USE

(75) Inventors: Eiji Kobayashi, Takanezawa-machi (JP); Shoji Sato, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/595,940

(22) PCT Filed: Nov. 18, 2004

(86) PCT No.: PCT/JP2004/017629

§ 371 (c)(1),
(2), (4) Date: Jan. 10, 2007

(87) PCT Pub. No.: WO2005/049300

PCT Pub. Date: May 19, 2005

(65) Prior Publication Data

US 2007/0222238 A1    Sep. 27, 2007

(30) Foreign Application Priority Data

Nov. 20, 2003   (JP)  ............................. 2003-391191

(51) Int. Cl.
*B62D 25/08*   (2006.01)

(52) U.S. Cl. .................................... 293/115; 296/193.1
(58) Field of Classification Search ................. 293/115; 296/193.09, 193.1
See application file for complete search history.

(56) References Cited

U.S. PATENT DOCUMENTS

| | | | | |
|---|---|---|---|---|
| 4,645,250 A | * | 2/1987 | Bauer et al. | .................. 293/115 |
| 6,405,819 B1 | * | 6/2002 | Ohkura et al. | .............. 180/68.1 |
| 6,527,317 B2 | * | 3/2003 | Fox et al. | ..................... 293/115 |

FOREIGN PATENT DOCUMENTS

| | | |
|---|---|---|
| JP | 63-41133 Y2 | 10/1988 |
| JP | 09-089165 A | 3/1997 |
| JP | 2000-108821 A | 4/2000 |
| JP | 2000-156921 A | 6/2000 |
| JP | 2002-059794 A | 2/2002 |
| JP | 2003-191279 A | 7/2003 |

* cited by examiner

*Primary Examiner*—Dennis H Pedder
(74) *Attorney, Agent, or Firm*—Standley Law Group LLP

(57) ABSTRACT

An injection-molded product comprising separate-member-fixing hooks each connected to an edge of its body via a thin hinge, said injection-molded product being formed by injecting a molten resin into a die comprising a pair of die plates, and said hooks extending from the edge substantially perpendicularly to a parting direction of a die in an as-molded state.

12 Claims, 6 Drawing Sheets

INJECTION-MOLDED PRODUCT AND ITS USE

FIELD OF THE INVENTION

The present invention relates to an injection-molded product free from undercut in an as-molded state, to which a separate member can be easily fixed, and a bumper for an automobile as a use thereof.

BACKGROUND OF THE INVENTION

An injection-molding die comprises a stationary die plate and a movable die plate for providing a cavity when closed, into which a molten resin is injected, and the parting of the movable die plate from the stationary die plate makes it possible to remove an injection-molded product having a shape corresponding to the cavity from the die. If the injection-molded product had undercut, the die would have a complicated structure to enable the removal of the injection-molded product. Accordingly, the injection-molded product preferably has a shape with as little undercut as possible.

For instance, some of injection-molded synthetic resin front bumpers for automobiles have openings in their bodies, to which grilles as separate members are fixed, but many of them have undercut in grille-fixing portions such as screw seats, etc. (see JP 2002-59794 A).

If there were no undercut in the grille-fixing portions of the front bumpers, the grille-fixing portions would likely be exposed from the edges of the openings of the front bumper bodies. Accordingly, the grille-fixing portions would be seen from front, providing poor appearance, and the grilles would have reduced opening area, leading to the reduction of an air flow to radiators.

JP 2000-108821 A discloses, as a mechanism of fixing a grille to a front bumper, a mechanism comprising projections extending rearward from an opening edge of the front bumper, through-holes formed in a flange of the grille for receiving the projections, and stoppers engageable with the projections penetrating the through-holes. The above mechanism further comprises a means for fixing the flange to the opening edge of the front bumper, and a mechanism for fixing the flange of the grille to the opening edge of the front bumper by screws. In the grille-fixing mechanism of JP 2000-108821 A, the grille-fixing portion is not exposed from the opening edge of the front bumper body, and the front bumper body is free from undercut.

However, the above fixing mechanism of JP 2000-108821 A needs the stoppers of the projections, and the flange-fixing means serve only to reduce the number of fasteners such as screws, etc., failing to fix the grille by themselves. In addition, the flange-screwing mechanism needs screws. Thus, the grille-fixing mechanism of JP 2000-108821 A needs a large number of fasteners, resulting in poor operation efficiency.

OBJECTS OF THE INVENTION

Accordingly, an object of the present invention is to provide an integral injection-molded product free from undercut in hooks for fixing a separate member in an as-molded state, the hooks being turned such that they can fix the separate member.

Another object of the present invention is to provide an integral bumper for an automobile free from undercut in hooks for fixing a grille in an as-molded state, the hooks being turned such that they can fix the grille.

SUMMARY OF THE INVENTION

As a result of intense research in view of the above objects, the inventors have found that because hooks for fixing a separate member (grille), which are connected via thin hinges to a body edge of an as-injection-molded product (bumper for an automobile), are substantially perpendicular to a parting direction of a die, the as-injection-molded product is free from undercut, and that the fixing operation of the separate member can be efficiently carried out by turning the hooks to a position at which they are substantially in parallel with the injection-molded product body and holding them at this position. The present invention has been accomplished by this finding.

Thus, the injection-molded product of the present invention comprises separate-member-fixing hooks each connected to an edge of its body via a thin hinge, the injection-molded product being formed by injecting a molten resin into a die comprising a pair of die plates, and the hooks extending from the edge substantially perpendicularly to a parting direction of the die in an as-molded state.

In a preferred embodiment of the present invention, each hook comprises a nail for being received in each hole of the separate member to fix the separate member, the nail projecting from the hook substantially in parallel with a parting direction of the die in an as-molded state.

In another preferred embodiment of the present invention, each hook comprises a hole for receiving each projection of the separate member to fix the separate member, the hole penetrating through the hook substantially in parallel with a parting direction of the die in an as-molded state.

In a further preferred embodiment of the present invention, the hook comprises one or more lateral projections engageable with holders formed in an edge of the body to keep the hook substantially in parallel with the body.

The bumper for an automobile according to the present invention comprises an opening for receiving a grille, and hooks for fixing the grille, which are connected to an edge of the opening via a thin hinge, the bumper being formed by injecting a molten resin into a die comprising a pair of die plates, and the hooks extending inward from an edge of the opening substantially perpendicularly to a parting direction of the die in an as-molded state.

In a further preferred embodiment of the present invention, the hook comprises a nail for being received in each hole of the grille to fix the grille, the nail projecting from the hook substantially in parallel with a parting direction of the die in an as-molded state.

In a further preferred embodiment of the present invention, the hook comprises a hole for receiving each projection of the grille, the hole penetrating through the hook substantially in parallel with a parting direction of the die in an as-molded state.

In a further preferred embodiment of the present invention, the hook comprises one or more lateral projections engageable with holders formed in an edge of the body to keep the hook substantially in parallel with the body by an elastic force.

DETAILED DESCRIPTION OF THE PREFERRED EMBODIMENTS

Figure 1:
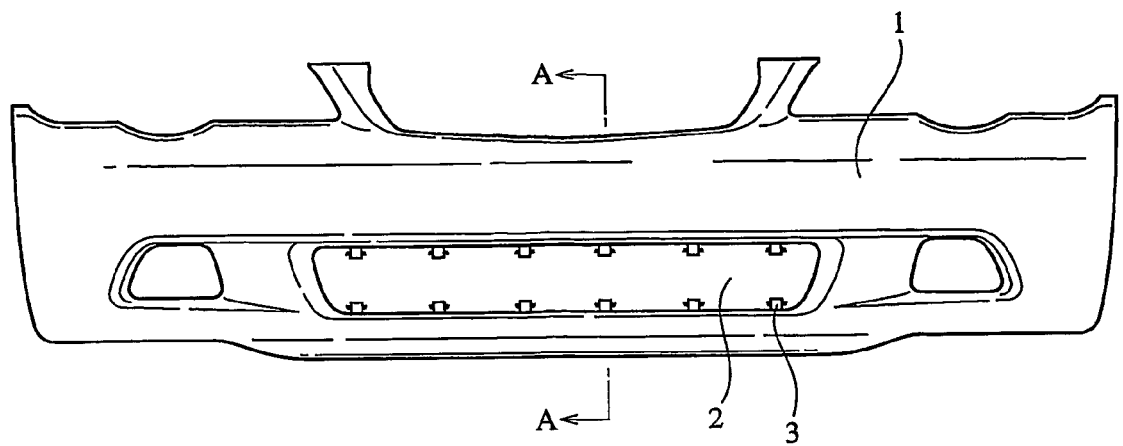
FIG. 1 is a front view showing a bumper for an automobile in an as-molded state according to one embodiment of the present invention.

A bumper for an automobile will be explained below in detail referring to the drawings as an example of the injection-molded product of the present invention.

[1] Bumper for Automobile

Figure 2:
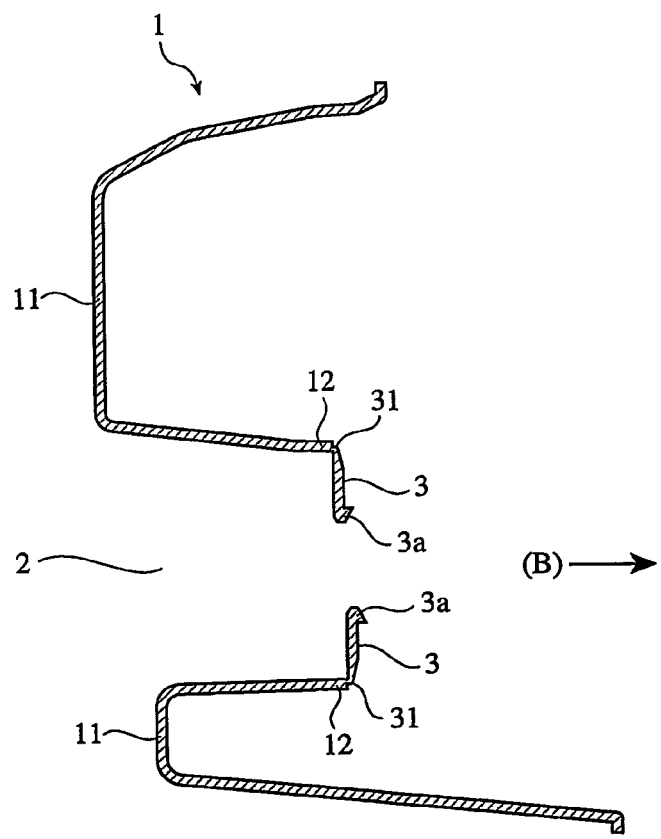
FIG. 2 is a cross-sectional view taken along the line A-A in FIG. 1.

FIG. 1 is a front view showing a bumper for an automobile according to the present invention, and FIG. 2 is a cross-sectional view taken along the line A-A in FIG. 1. As shown in FIG. 1, the automobile bumper 1 (simply referred to as "bumper" hereinafter) of the present invention is an integral product obtained by injection-molding a synthetic resin, which comprises an opening 2 for receiving a lower grille 4 (see FIG. 7, simply referred to as "grille" hereinafter). The grille 4 is inserted into the opening 2 from the rear side of the bumper 1. As shown in FIG. 2, the opening 2 extends horizontally from the front side to the rear side of the bumper 1, and pluralities of hooks 3 engageable with a grille 4 are connected to a rear edge 12 of the opening 2 via thin hinges 31 such that said hooks extend from the rear edge of the opening substantially perpendicularly to a parting direction (B) of an associated injection molding die. Each hook 3 comprises a nail 3a projecting from its end toward the rear side of the bumper 1 and in a direction substantially parallel to the parting direction (B) of the associated injection molding die, such that the nail 3a is received in a hole of each attachment projecting from an edge of the grille 4 to fix the grille 4 to the bumper 1. Because the bumper 1 is made of a flexible synthetic resin such as polypropylene, etc., the hook 3 formed in the body 11 of the bumper 1 via the thin hinge 31 is swingable about the hinge 31.

Figure 3A:
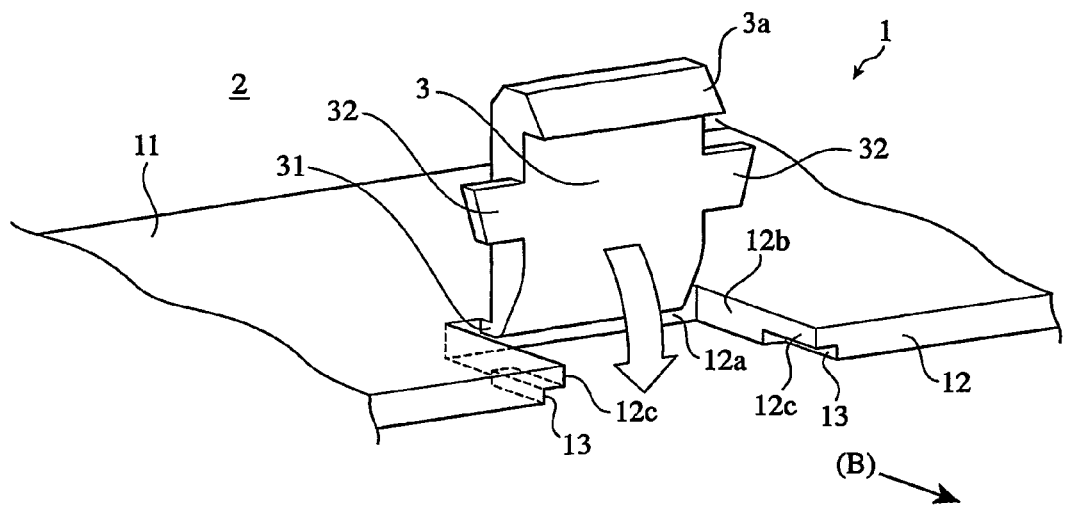
FIG. 3(a) is a partial, enlarged, perspective view showing the hook of the bumper of FIG. 1, which is in an as-molded state.
Figure 3B:
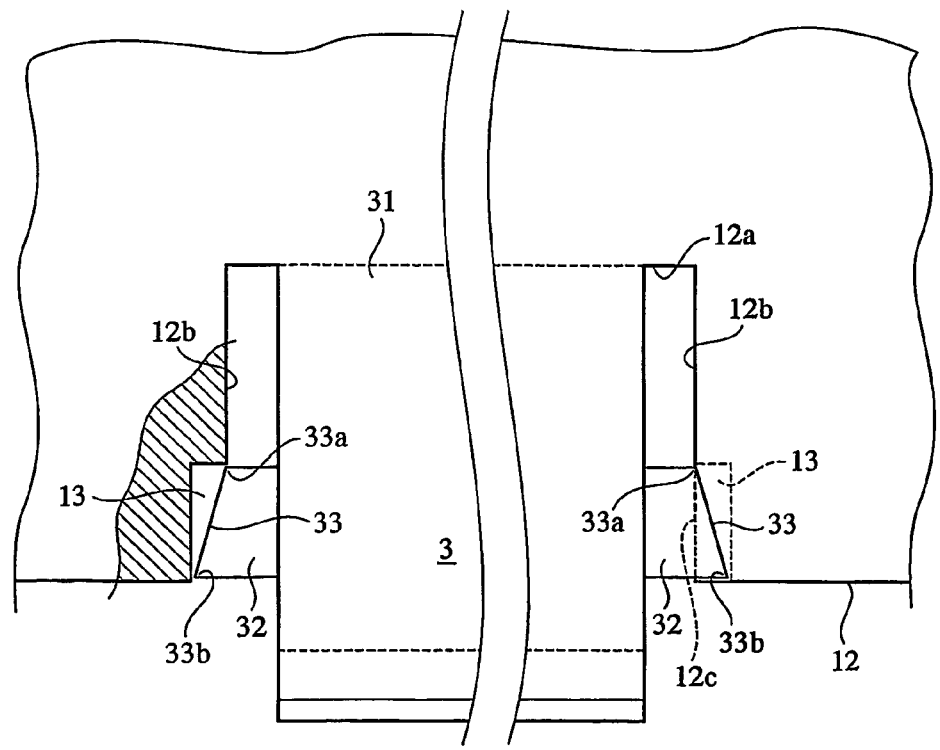
FIG. 3(b) is a partial, enlarged, perspective view showing the hook of the bumper of FIG. 1, which is turned until it is brought into contact with a bumper body.
Figure 4:
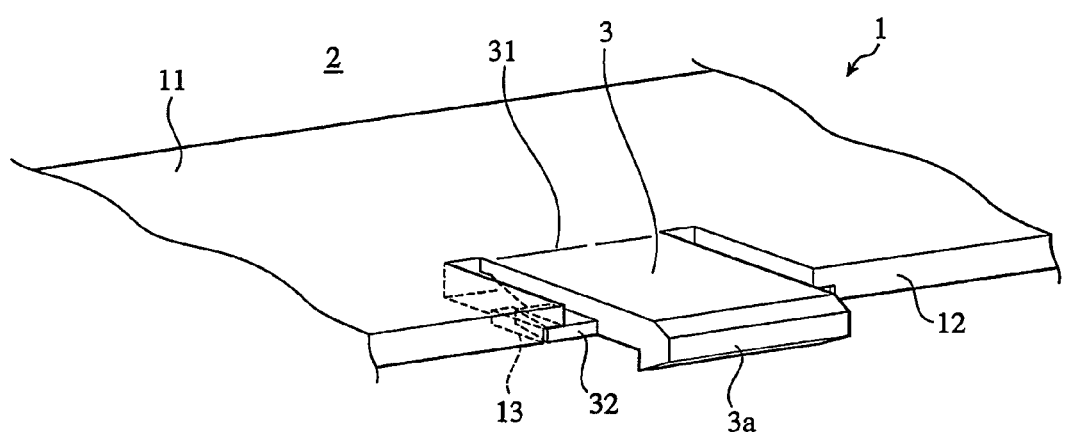
FIG. 4 is a partial, enlarged, perspective view showing the hook of FIG. 3(a), whose lateral projections engage holders formed on the body edge.

FIGS. 3 and 4 show a lower hook 3 and an edge 12 of the opening 2 of the bumper 1. The edge 12 has a U-shaped recess around each hook 3, which comprises a rear edge 12a and two side edges 12b, 12b. The hook 3 connected to the rear edge 12a via the thin hinge 31 comprises a nail 3a for fixing the grille. The length of the hook 3 is set such that the nail 3a projects from the edge 12 when the hook 3 is substantially in parallel with the bumper body 11.

As shown in FIG. 3(a), a pair of lateral projections 32, 32 substantially in parallel with the thin hinge 31 extend from the side edges of the hook 3. Each lateral projection 32 extending from the side edge of the hook 3 is preferably as thick as about half of the side edge of the hook 3, closer to the rear surface [a front surface in FIG. 3(a)] of the hook 3. Each side edge 12b of the bumper body 11 has a holder 13 engageable with each lateral projection 32. Each holder 13 is preferably as thick a step as about half of the side edge 12b, closer to the rear surface [a lower surface in FIG. 3(a)] of the bumper body 11. Further, as shown in FIG. 3(b), slanting tip surfaces 33, 33 of the lateral projections 32, 32 preferably expand forward, such that when viewed from above, the rear ends 33a, 33a of the slanting tip surfaces 33, 33 are located at or near outer rear ends of the steps 13, 13, while the tip ends 33b, 33b are located at or near inner front ends of the steps 13, 13.

When the hook 3 is rotated around the thin hinge 31, each lateral projection 32 having the above-mentioned shape is brought into contact with each side edge 12b. However, the rear end 33a of the slanting tip surface 33 of each lateral projection 32 would be in contact with each side edge 12b only in a small area if any, and each slanting tip surface 33 is in slanting contact with each side edge 12b. Accordingly, each lateral projection 32 of the hook 3 elastically deforms so easily that it passes each side edge 12b to the underlying step 13. Though the hook 3 tends to return to its original position by elasticity when it is freed, it is held substantially in parallel with the bumper body 11 because of engagement with an overhang 12c of each step 13.

The nail 3a of the hook 3, which projects toward the rear side of the bumper 1 in an as-molded state [FIG. 3(a)], projects outside of the opening 2 as shown in FIG. 4, when the hook 3 is in parallel with the bumper body 11.

Figure 5:
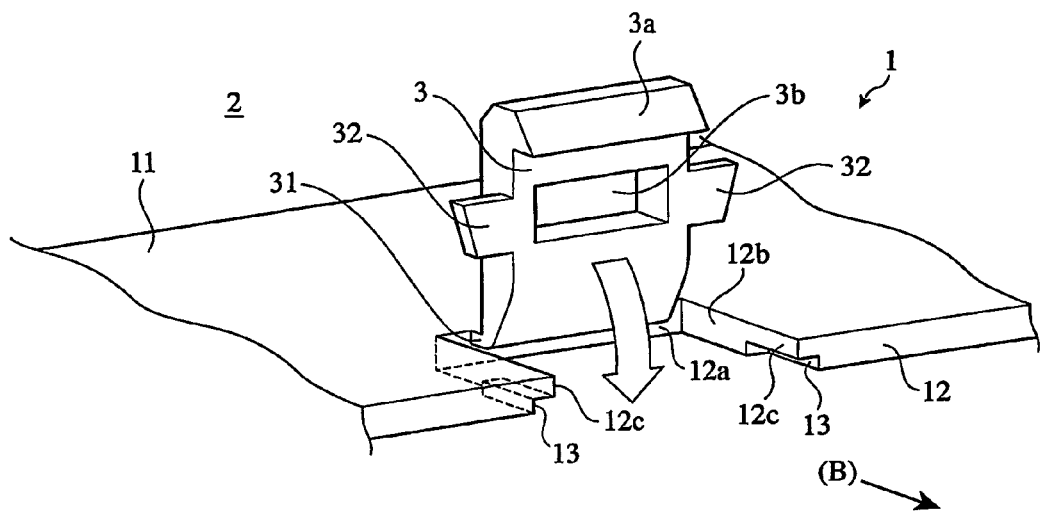
FIG. 5 is a partial, enlarged, perspective view showing another example of the hook, which is in an as-molded state.
Figure 6:
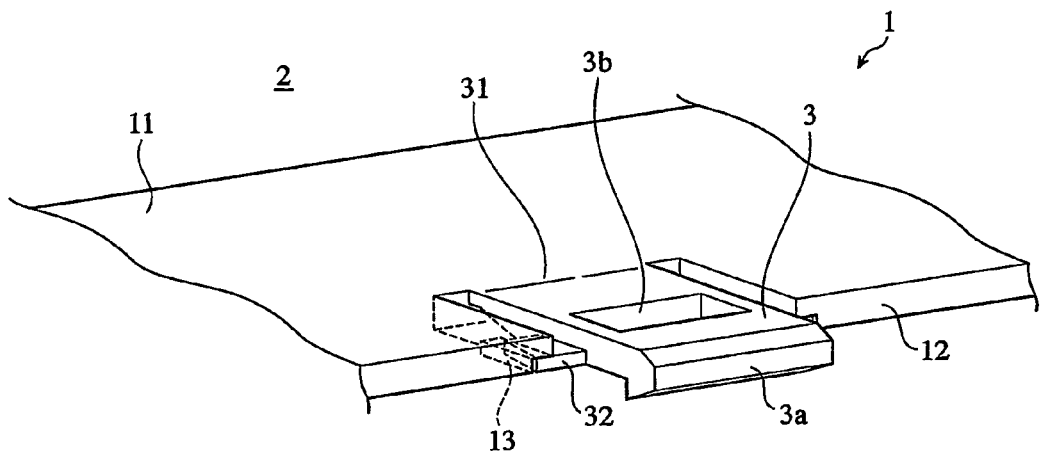
FIG. 6 is a partial, enlarged, perspective view showing the hook of FIG. 5, whose lateral projections engage holders formed on the body edge.

FIGS. 5 and 6 show another example of the hook 3. The hook 3 is substantially the same as shown in FIGS. 3 and 4, except that it comprises a through-hole 3b in the hook 3 that extends in a direction substantially parallel to the parting direction (B) of an associated injection molding die. The through-hole 3b receives a projection 42 formed on the edge of the grille 4 shown in FIG. 7. Because the axis of the through-hole 3b is in alignment with the axial direction of the bumper 1 (parting direction (B) of the die) in an as-molded state (FIG. 5), it is easy to remove the injection-molded bumper from the die as mentioned below. Further, when the hook 3 is kept substantially in alignment with the bumper body 11 by the engagement of the lateral projections 32, 32 with the steps 13, 13 as shown in FIG. 6, the axis of the through-hole 3b is in alignment with the vertical direction of the bumper 1 (perpendicular to the opening 2).

Thought not particularly limited, the number of the hooks 3 may usually be 5 to 7 along each upper and lower edge 12 of the bumper 1. Too many hooks 3 make the attachment of the grille 4 complicated, providing only excess fixing of the grille 4.

[2] Mechanism of Fixing Grille

Figure 7:
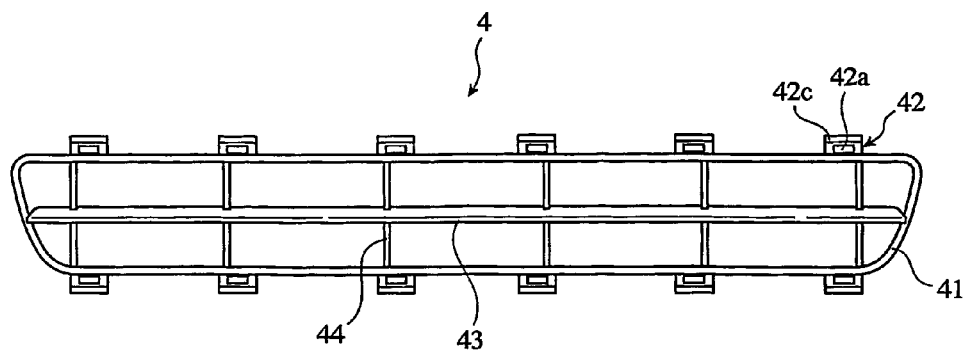
FIG. 7 is a front view showing one example of a lower grille.

FIG. 7 shows one example of the grille 4 fixed to the bumper 1. The grille 4 is an integrally molded product made of a synthetic resin such as an ABS resin, etc, which comprises a frame 41, pluralities of bumper-fixing projections 42 extending from the edge of the frame 41, a horizontal fin 43 mounted inside the frame 41, and pluralities of vertical fins 44 mounted inside the frame 41. Each projection 42 comprises a hole 42a, into which each hook 3 enters. Each hole 42a of the projection 42 preferably has substantially the same width as that of the hook 3, to fix the grille 4 firmly.

Figure 8:
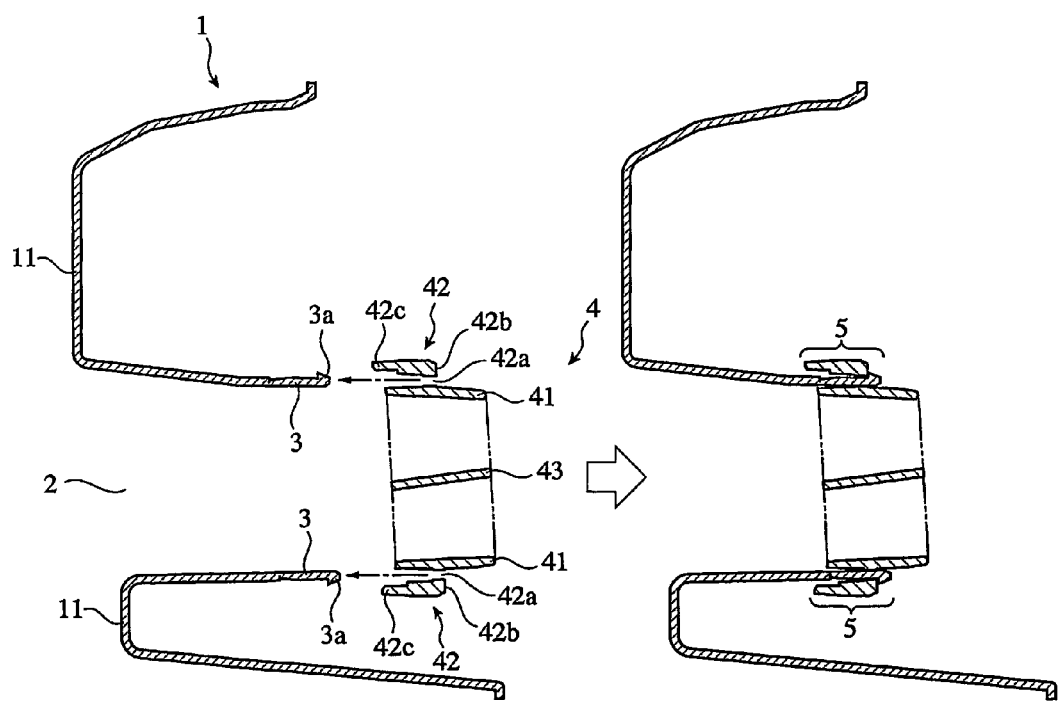
FIG. 8 is a cross-sectional view showing one example of the attachment of a lower grille to the bumper of FIG. 3.

As shown in FIG. 8, when the grille 4 is pushed to the opening 2 from the rear side of the bumper 1, each hook 3 of the bumper 1 enters into each hole 42a of the grille 4, until the nail 3a of the hook 3 engages a rear surface 42b of the projection 42. The hole 42a of the grille 4 has such a shape that once the nail 3a engages the rear surface 42b of the projection 42, the grille 4 is firmly fixed to the bumper 1. However, such shape of the hole per se is known in the art, its detailed explanation will be omitted. With such mechanism of fixing the nail 3a to the hole 42a of the projection 42 of the grille 4, an attachment 5 is not exposed to the opening 2 as shown in FIG. 8. Also, because the grille 4 can be fixed to the bumper 1 simply by pushing the grille 4 by hand, the fixing operation is easy needing no fixing members such as screws, etc., with smaller number of parts.

Figure 9:
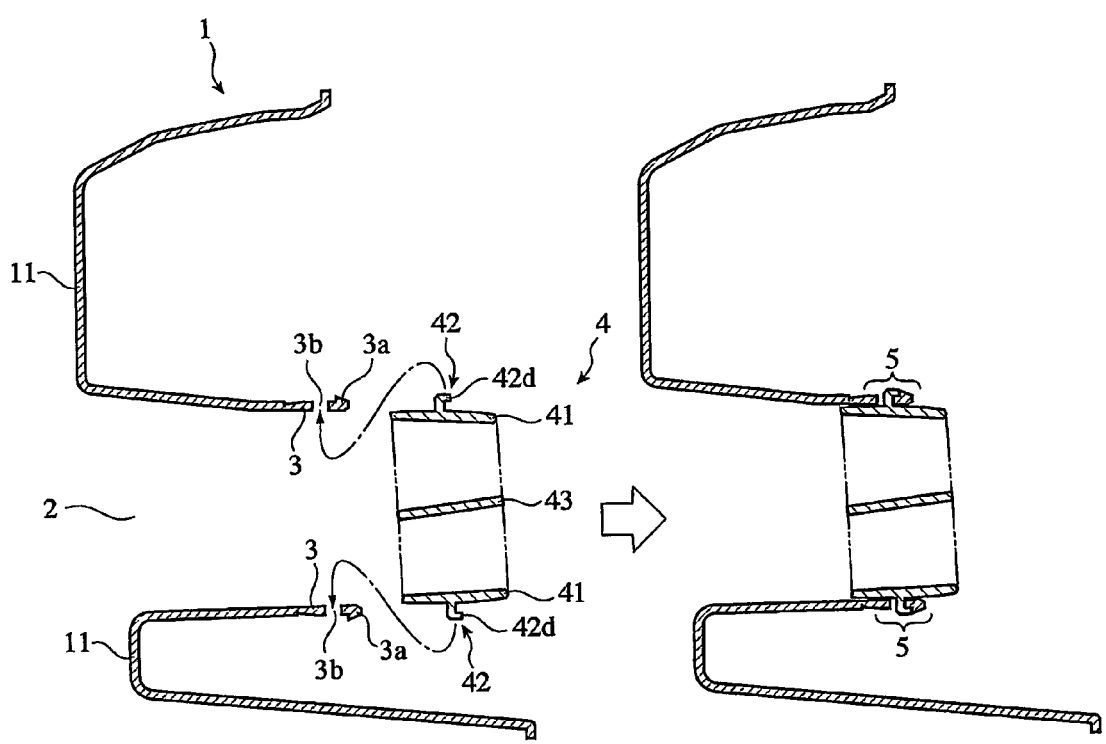
FIG. 9 is a cross-sectional view showing another example of the attachment of a lower grille to the bumper of FIG. 5.

When the grille 4 is fixed to the bumper 1 shown in FIGS. 5 and 6, as shown in FIG. 9, the grille 4 comprising projections 42 each having a nail 42d engageable with the through-hole 3b of the hook 3 is used. When the grille 4 is pressed to the opening 2 from the rear side of the bumper 1, the hook 3 is elastically deformed while riding over the projection 42 of the grille 4. When the projection 42 reaches the through-hole 3b of the hook 3, the projection 42 enters into the through-hole 3b, and the hook 3 returns substantially parallel with the opening 2 of the bumper 1. As a result, the nail 42d of the projection 42 engages with the nail 3a of the hook 3. To firmly fix the grille 4, the width of the projection 42 is substantially the same as that of the through-hole 3b. By fixing the projections 42 formed on the edge of the grille 4 to the vertical through-holes 3b of the hooks 3, an attachment 5 is not exposed to the opening 2 as shown in FIG. 9.

[3] Method of Molding Bumper

In the as-injection-molded bumper 1, as shown in FIGS. 2 and 3, the nail 3a of the hook 3 is substantially in parallel with a parting direction of the die, providing the bumper 1 with no undercut. The term "substantially in parallel with a parting direction" includes not only complete parallel with the parting direction, but also deviation from parallel in a range that the injection-molded product can be removed from the die. In the case of the bumper 1 shown in FIGS. 5 and 6, too, the nail 3a and the through-hole 3b of the hook 3 are substantially in parallel with a parting direction of the die, providing the bumper 1 with no undercut.

Though the present invention has been explained referring to the drawings as described above, it is not restricted thereto, and various modifications can be made unless deviating from the spirit of the present invention.

The injection-molded product (bumper for an automobile) of the present invention does not have undercut in an as-molded state, because hooks connected to its edge via thin hinges are substantially perpendicular to the parting direction of the die, and thus the nails (and through-holes) of the hooks are substantially in parallel with the parting direction of the die. Accordingly, the injection-molded product can easily be removed from the die. Also, the hooks can be kept substantially parallel with the body, when a separate member (grille) is fixed. Accordingly, only a small number of parts for fixing the separate member are needed, resulting in good efficiency in the fixing operation.

The invention claimed is:

1. An injection-molded product formed by injecting a molten resin into a die comprising a pair of die plates, said injection-molded product comprising separate-member-fixing hooks each connected to an edge of its body via a thin hinge, said hooks extending from said edge substantially perpendicularly to a parting direction of said die in an as-molded state, each hook having a hole for receiving a projection of a separate member to fix said separate member, said hole penetrating through said hook substantially in parallel with a parting direction of said die in an as-molded state.

2. The injection-molded product according to claim 1, wherein each hook comprises a nail for being received in each hole of a separate member to fix said separate member, said nail projecting from said hook substantially in parallel with a parting direction of said die in an as-molded state.

3. An injection-molded product formed by injecting a molten resin into a die comprising a pair of die plates, said injection-molded product comprising separate-member-fixing hooks each connected to an edge of its body via a thin hinge, said hooks extending from said edge substantially perpendicularly to a parting direction of said die in an as-molded state, each hook having lateral projections engageable with holders formed in an edge of said body to keep said hook substantially in parallel with said body.

4. A bumper for an automobile comprising a body having an opening for receiving a grille, and hooks for fixing said grille, said hooks connected to an edge of said opening via a thin hinge, said bumper being formed by injecting a molten resin into a die comprising a pair of die plates, and said hooks extending inward from an edge of said opening substantially perpendicularly to a parting direction of said die in an as-molded state.

5. The bumper for an automobile according to claim 4, wherein each hook includes a nail for being received in a hole of said grille to fix said grille, said nail projecting from said hook substantially in parallel with a parting direction of said die in an as-molded state.

6. The bumper for an automobile according to claim 4, wherein each hook includes a hole for receiving a projection of said grille, said hole penetrating through said hook substantially in parallel with a parting direction of said die in an as-molded state.

7. The bumper for an automobile according to claim 4, wherein each hook includes at least one lateral projections engageable with a holder formed in an edge of said body to keep said hook substantially in parallel with said body.

8. The injection-molded product according to claim 2, wherein each hook includes at least one lateral projections engageable with a holder formed in an edge of said body to keep said hook substantially in parallel with said body.

9. The injection-molded product according to claim 1, wherein each hook includes at least one lateral projection engageable with a holder formed in an edge of said body to keep said hook substantially in parallel with said body.

10. The bumper for an automobile according to claim 5, wherein each hook includes at least one lateral projection engageable with a holder formed in an edge of said body to keep said hook substantially in parallel with said body.

11. The bumper for an automobile according to claim 6, wherein each hook includes at least one lateral projection engageable with a holder formed in an edge of said body to keep said hook substantially in parallel with said body.

12. The injection-molded product according to claim 3, wherein each hook further includes a hole for receiving a projection of a separate member to fix said separate member, said hole penetrating through said hook substantially in parallel with a parting direction of said die in an as-molded state.

* * * * *

UNITED STATES PATENT AND TRADEMARK OFFICE
CERTIFICATE OF CORRECTION

PATENT NO. : 7,461,875 B2  Page 1 of 1
APPLICATION NO. : 10/595940
DATED : December 9, 2008
INVENTOR(S) : Kobayashi et al.

It is certified that error appears in the above-identified patent and that said Letters Patent is hereby corrected as shown below:

In column 6, line 37, please delete "projections" and insert -- projection --.

In column 6, line 41, please delete "projections" and insert -- projection --.

Signed and Sealed this

Thirteenth Day of January, 2009

JON W. DUDAS
*Director of the United States Patent and Trademark Office*